Patented Dec. 12, 1939

2,183,046

UNITED STATES PATENT OFFICE 2,183,046

PURIFICATION OF CHLORINATED ALIPHATIC HYDROCARBONS

John H. Reilly, Midland, Mich., assignor to The Dow Chemical Company, Midland, Mich., a corporation of Michigan No Drawing. Application November 30, 1936, Serial No. 113,443

8 Claims. (Cl. 260—652)

This invention relates to methods for the purification of chlorinated aliphatic hydrocarbons and carbon chlorides containing unsaturated materials as impurities. The term "chlorinated aliphatic hydrocarbons" as hereinafter used in the disclosure and claims, includes the carbon chlorides, such as carbon tetrachloride, as well as the compounds of the chloroform series, olefine dichlorides, such as ethylene chloride and propylene chloride, and higher chlorinated aliphatic hydrocarbons, such as tetrachloroethane, pentachloropropane, and the like.

The method hereinafter described refers generally to freeing chlorinated aliphatic hydrocarbons from unsaturated materials which impart to such hydrocarbons undesirable odors. These impurities are present in very minor proportions, generally only as a trace, but they prohibit the use of the products in extraction processes such as those involved in the removal of essential oils and in the preparation of food stuffs. Repeated distillation of the chlorinated hydrocarbons will not rid them of their bad odor, nor will the treatment with an agent such as activated carbon.

Among the processes which are used in making chlorinated aliphatic hydrocarbons, whereof the product may contain malodorous unsaturated compounds are the following: the thermal substitution of chlorine in paraffin hydrocarbons or partially chlorinated derivatives thereof at elevated temperatures; and, reduction processes of the type exemplified by the production of chloroform from carbon tetrachloride. The invention has particular reference to the purification of chlorinated aliphatic hydrocarbons obtained by the direct addition of chlorine to olefines resulting from the pyrolysis of hydrocarbon oils.

It is, accordingly, among the objects of the present invention to provide a method whereby chlorinated aliphatic hydrocarbons can be freed from the aforesaid impurities. The invention, then, consists in the method of purifying crude chlorinated aliphatic hydrocarbons hereinafter fully described and particularly pointed out in the claims, the following description setting forth in detail only certain of the various ways in which the principle of my invention can be employed.

The exact nature of the impurities which contaminate the products obtained according to the aforedescribed procedures has not been determined, but they are of an unsaturated character, and I have now found that by heating the impure chlorinated aliphatic hydrocarbons in the presence of sulphur chloride, particularly under refluxing conditions for a suitable period of time depending upon the proportion of impurities present, that the removal of such malodorous unsaturated impurities can be accomplished. Whether this treatment results in converting the impurities to sulphur compounds, or whether it effects the polymerization of the unsaturated impurities, or is a combination of such actions, I have not determined. After treatment with sulphur chloride I may distill the chlorinated aliphatic hydrocarbon in a relatively pure condition directly from the treating zone. However, I may incorporate a higher fatty acid compound or a phenol with the reaction mixture and then distill. Among the fatty acid compounds which I have determined to be suitable for use are the higher fatty acids and esters thereof, e. g. oleic acid, stearic acid, palmitic acid, glycerol oleate, lard oil, and the like. Among the phenols I have found suitable for use are phenol, and homologues thereof, such as alkylated and aralkylated phenols, e. g. cresol, dimethyl phenol, benzylphenol, etc., and the polyphenols, such as catechol and resorcinol. All of the foregoing compounds are well known in the art to be weakly acidic organic compounds.

The quantity of sulphur chloride to be used is governed by the amount of unsaturated substance present in the chlorinated aliphatic hydrocarbon to be purified. In general, this will vary between about 0.25 per cent and about 5.0 per cent by weight, based upon the weight of the material to be treated. Either the mono- or di-chloride of sulphur may be employed with equivalent results. The material to be purified and the sulphur chloride may be refluxed together in the presence of relatively small quantities of a chlorination catalyst, e. g. iron chloride, aluminum chloride, etc., the time during which the material should be refluxed depending upon the amount of impurities present.

After the sulphur chloride treatment the material may be treated in either of two ways. One way is to add the fatty acid compound or phenol directly to the product after refluxing with sulphur chloride, and fractionally distilling the purified chloro- compound from the mixture. The quantity of such agent to be added may vary, for example, between about 0.1 per cent and about 0.5 per cent, based on the weight of the chloro- compound being treated. Another way is to distill off the chloro- compound after the sulphur chloride treatment and neutralize the distillate with aqueous alkali, then dry, for example by gravity separation, add the agent thereto, and fractionally distill the mixture to obtain the purified material.

The following examples illustrate my improved method for the purification of chlorinated compounds.

Example 1

12,000 pounds of impure ethylene chloride, obtained by the chlorination of ethylene produced by the pyrolysis of a hydrocarbon oil according to the procedure described in U. S. Patent 1,962,502, was treated with 150 pounds of sulphur dichloride, refluxing for two hours in iron apparatus. At the end of this time 5 gallons of commercial oleic acid was mixed thoroughly with the product, which was then fractionally distilled. The fraction boiling at 85.5° C., the boiling point of pure ethylene chloride, was collected. This portion amounted to approximately 10,200 pounds, which is about an 85 per cent yield of pure product. The product was chemically pure and gave off no undesirable odor.

I have also carried out the purification of ethylene chloride by adding thereto sulphur chloride, refluxing the mixture, effecting a simple distillation thereof, adding enough aqueous sodium hydroxide solution to neutralize the same, layering-off the supernatant water layer, adding oleic acid to the residual layer, and fractionally distilling the same to obtain pure, odorless ethylene chloride.

Example 2

Technical chloroform having an undesirable odor was purified in the following manner: 1000 grams of technical chloroform, 10 grams of sulphur dichloride, and 0.5 gram of ferric chloride were refluxed together for 15 minutes, and the chloroform distilled from the product. This was then neutralized with aqueous alkali and dried with calcium chloride to obtain 970 grams of partially purified chloroform. Into this was then incorporated 5 milliliters of oleic acid, and the mixture was fractionally distilled to obtain 950 grams of pure chloroform, free from undesirable odor.

By similar procedure I have also purified carbon tetrachloride and propylene chloride, with similar results.

This application is a continuation-in-part of my prior application Serial Number 72,982, filed April 6, 1936.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. The method for the purification of a chlorinated saturated aliphatic hydrocarbon containing unsaturated impurities, which comprises, adding sulphur chloride thereto and distilling from the resulting mixture the said chlorinated aliphatic hydrocarbon in a relatively pure condition.

2. The method for the purification of a chlorinated saturated aliphatic hydrocarbon containing unsaturated impurities, which comprises, adding sulphur chloride thereto, refluxing the mixture, and distilling from the resulting mixture the said chlorinated aliphatic hydrocarbon in a relatively pure condition.

3. The method for the purification of a chlorinated saturated aliphatic hydrocarbon containing unsaturated impurities, which comprises, adding sulphur chloride thereto, refluxing the mixture, adding oleic acid thereto, and distilling from the resulting mixture the said chlorinated aliphatic hydrocarbon in a relatively pure condition.

4. The method for the purification of a chlorinated saturated aliphatic hydrocarbon containing unsaturated impurities, which comprises, adding thereto between about 0.25 per cent and about 5.0 per cent by weight of sulphur chloride, and distilling from the resulting mixture the said chlorinated aliphatic hydrocarbon in a relatively pure condition.

5. The method of purifying an impure chlorinated saturated aliphatic hydrocarbon resulting from the direct chlorination of the product obtained by the pyrolysis of paraffin hydrocarbons, which comprises, adding thereto between about 0.25 per cent and about 5.0 per cent by weight of sulphur chloride, refluxing the mixture, and distilling therefrom the said chlorinated aliphatic hydrocarbon in a relatively pure condition.

6. The method for the purification of ethylene chloride resulting from the direct chlorination of oil-gas, which comprises, adding thereto between about 0.25 per cent and about 5.0 per cent by weight of sulphur chloride, refluxing the mixture, and distilling therefrom the said chlorinated aliphatic hydrocarbon in a relatively pure condition.

7. The method of purifying an impure chlorinated saturated aliphatic hydrocarbon resulting from the direct chlorination of the product obtained by the pyrolysis of paraffin hydrocarbons, which comprises, adding thereto between about 0.25 per cent and about 5.0 per cent by weight of sulphur chloride, refluxing the mixture, adding oleic acid thereto, and distilling therefrom the said chlorinated aliphatic hydrocarbon in a relatively pure condition.

8. The method of purifying an impure chlorinated saturated aliphatic hydrocarbon resulting from the direct chlorination of the product obtained by the pyrolysis of paraffin hydrocarbons, which comprises, adding thereto between about 0.25 per cent and about 5.0 per cent by weight of sulphur chloride, refluxing the mixture, adding thereto between about 0.1 per cent and about 0.5 per cent, based on the weight of the chlorocompound being treated, of oleic acid, and distilling therefrom the said chlorinated aliphatic hydrocarbon in a relatively pure condition.

JOHN H. REILLY.